(12) United States Patent
Hashimoto

(10) Patent No.: US 7,853,797 B2
(45) Date of Patent: Dec. 14, 2010

(54) INFORMATION PROCESSING METHOD AND INFORMATION PROCESSING APPARATUS

(75) Inventor: Minoru Hashimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 10/970,168

(22) Filed: Oct. 21, 2004

(65) Prior Publication Data

US 2005/0114696 A1 May 26, 2005

(30) Foreign Application Priority Data

Oct. 30, 2003 (JP) .......................... 2003-370868
Sep. 9, 2004 (JP) .......................... 2004-262797

(51) Int. Cl.
*H04K 1/00* (2006.01)
*H04L 9/00* (2006.01)
*G06F 7/04* (2006.01)
*H03M 1/68* (2006.01)

(52) U.S. Cl. ........................................ 713/184; 726/26

(58) Field of Classification Search ................. 382/166; 358/1; 704/3; 710/8; 718/106; 726/26, 726/25; 713/156, 186, 184; 455/70
See application file for complete search history.

(56) References Cited

U.S. PATENT DOCUMENTS

| | | | |
|---|---|---|---|
| 6,636,903 B2 * | 10/2003 | Endoh et al. .................... 710/8 |
| 6,717,689 B1 * | 4/2004 | Endo et al. ................. 358/1.15 |
| 6,864,991 B1 * | 3/2005 | Takahashi .................. 358/1.15 |
| 7,304,757 B2 * | 12/2007 | Parry et al. ................. 358/1.15 |
| 2001/0044805 A1 * | 11/2001 | Multer et al. ................ 707/201 |
| 2001/0054154 A1 * | 12/2001 | Tam ............................ 713/186 |
| 2003/0073432 A1 * | 4/2003 | Meade, II .................... 455/420 |
| 2003/0088429 A1 * | 5/2003 | Schmeling et al. .............. 705/1 |
| 2003/0117640 A1 | 6/2003 | Parry et al. |
| 2003/0177366 A1 * | 9/2003 | de Jong ....................... 713/184 |
| 2003/0217103 A1 * | 11/2003 | Yamamoto et al. .......... 709/203 |
| 2005/0066163 A1 * | 3/2005 | Ikenoya ...................... 713/156 |
| 2007/0226746 A1 * | 9/2007 | Osaka ......................... 718/106 |
| 2007/0229876 A1 * | 10/2007 | Takashima ................. 358/1.14 |
| 2007/0229885 A1 * | 10/2007 | Kimura ..................... 358/1.15 |
| 2007/0240228 A1 * | 10/2007 | Kimura ......................... 726/27 |
| 2007/0260337 A1 * | 11/2007 | Sugiyama .................... 700/40 |
| 2007/0285712 A1 * | 12/2007 | Komada ..................... 358/1.15 |
| 2007/0294079 A1 * | 12/2007 | Ishikura et al. ................ 704/3 |
| 2008/0019590 A1 * | 1/2008 | Arakawa .................... 382/166 |

FOREIGN PATENT DOCUMENTS

JP 2001-306204 A 11/2001
JP 2003-208298 A 7/2003

* cited by examiner

*Primary Examiner*—Kambiz Zand
*Assistant Examiner*—Monjour Rahim
(74) *Attorney, Agent, or Firm*—Canon USA Inc IP Division

(57) ABSTRACT

An information processing method according to the present invention for processing information by an information processing apparatus communicable with a plurality of other information processing apparatuses receives identification information for identifying a user from at least one of the plurality of other information processing apparatuses and logs into at least one service provider that provides a service and that is associated with the identification information in accordance with information on the service provider.

16 Claims, 12 Drawing Sheets

FIG. 10

ASP1 INFORMATION {
- ASP1 name: Document Storage Service
- ASP1 URL: c-cabinet.xxxx.jp
- ASP1 Login: 1
- ASP1 icon Location H: 20
- ASP1 icon Location V: 300
- ASP1 icon Size W: 256
- ASP1 icon Size H: 256
- ASP1 icon Strings: " DOCUMENT STORAGE SERVICE "
- ASP1 icon Font Size: 16

ASP2 INFORMATION {
- ASP2 name: FAX Address Service
- ASP2 URL: faxaddress.xxxx.jp
- ASP2 Login: 0
- ASP2 icon Location H: 300
- ASP2 icon Location V: 300
- ASP2 icon Size W: 256
- ASP2 icon Size H: 256
- ASP2 icon Strings: " FAX ADDRESS SERVICE "
- ASP2 icon Font Size: 16
- ASP2 Login Fail Message: " WARNING : SINCE FAX FUNCTION IS NOT INSTALLED, LOGIN HAS NOT SUCCEEDED. "

FIG. 13

ASP1 INFORMATION
- ASP1 name: Document Storage Service
- ASP1 URL: c-cabinet.xxxx.jp
- ASP1 Login: 1
- ASP1 icon Location H: 20
- ASP1 icon Location V: 300
- ASP1 icon Size W: 256
- ASP1 icon Size H: 256
- ASP1 icon Strings: " DOCUMENT STORAGE SERVICE ( ONLY PRINTING ) "
- ASP1 icon Font Size: 16

ASP2 INFORMATION
- ASP2 name: FAX Address Service
- ASP2 URL: faxaddress.xxxx.jp
- ASP2 Login: 0
- ASP2 icon Location H: 300
- ASP2 icon Location V: 300
- ASP2 icon Size W: 256
- ASP2 icon Size H: 256
- ASP2 icon Strings: " FAX ADDRESS SERVICE "
- ASP2 icon Font Size: 16

INFORMATION PROCESSING METHOD AND INFORMATION PROCESSING APPARATUS

CROSS REFERENCE TO RELATED APPLICATIONS

This application claims priority from Japanese Patent Application No. 2003-370868 filed Oct. 30, 2003, and Japanese Patent Application No. 2004-262797 filed Sep. 9, 2004, which are hereby incorporated by reference herein.

BACKGROUND OF THE INVENTION

1. Field of the Invention

The present invention relates to information processing methods and information processing apparatuses for logging into service providers.

2. Description of the Related Art

In general, multifunction printers (MFPs) having multiple functions, such as a printing function, a copy function, a facsimile (FAX) function, and a scan function, are capable of receiving various services via the Internet from application service providers (hereinafter, referred to as ASPs) that develop the various services on the Internet.

Such ASPs develop various services in any field, and content suitable for each target user, for example, suitable for the purpose or usage is available. For some services, a receiver of a service is required to have a corresponding function.

A first example is a public printing service in which a document is uploaded to a server on the Internet via the Internet so as to be printed at anytime and from anywhere. In order to receive such a public printing service, an MFP must have a function to upload document data to a server via the Internet and a printing function (referred to as a page description language (PDL) function) to print the document data on the MFP. Since it is assumed that scan image data created by reading an image using a scanner installed in the MFP as well as data created by application software is uploaded, a function to create and send scan image data (referred to as a SEND function) is also required for the function to upload document data via the Internet.

A second example is a document storage service in which an MFP transfers scan image data to a server on the Internet so that various types of data are stored on the server. In order to receive such a document storage service, the MFP must have the SEND function described above.

A third example is a FAX transfer service in which an MFP receives transmitted fax data once and transfers the FAX data to a server on the Internet so that a plurality of users connected to the Internet can browse the FAX data. In order to receive such a FAX transfer service, the MFP must have the SEND function described above and a FAX function to receive FAX data.

In many cases, rights to use ASPs are granted to users. Users who are granted a right to use an ASP have an advantage in that any MFP that is capable of being connected to the ASP via the Internet, irrespective of a difference of an installation site or an apparatus type, can use the ASP. ASPs can be used by information terminals, such as personal computers (PCs), cellular telephones, and personal digital assistants (PDAs), as well as office automation (OA) apparatuses, such as MFPs. For example, the document storage service allows a PC or the like to upload or download a stored document and to check a document name list or the like.

A technology in which a customized value stored in a server is read into an information processing apparatus and a difference between the arrangement of the information processing apparatus and the customized value is detected so that the customized value is corrected and displayed on a user interface (UI) is known. (For example, see Japanese Patent Laid-Open No. 2001-306204.)

However, according to the known apparatus mentioned above, some problems occur when a plurality of MFPs or information terminals, such as PCs, use an ASP.

A first problem is that users have to memorize information necessary for logging into an ASP in order to use the ASP and, in particular, that memorizing of all of the information is difficult when users use a plurality of ASPs. Also, since when information on an ASP can be registered into an MFP, information on the ASP must be registered into all the MFPs that might possibly be used. Thus, troublesome registration operations are required.

A second problem is that it is hard for users to determine whether or not a desired ASP can be used by them. Even if users memorize information necessary for login, the users may forget about an ASP that can be used by them.

A third problem is that it is hard for users to determine whether or not an MFP or a PC used by them has a function appropriate for receiving various services provided by an ASP. For example, in order to use the public printing service described above, an MFP must have the SEND function so as to upload a document to a server. Also, the MFP must have the PDL function so as to acquire the document from the server and to perform printing based on the document. As described above, even if an MFP or PC can log into an ASP, a service may not be used or only a part of the service may be used, depending on the arrangement of the MFP or the PC.

SUMMARY OF THE INVENTION

Accordingly, an information processing method, an information processing apparatus, and an information processing system that have a function to log into a usable ASP without memorizing login information for the ASP by a user and that allow a plurality of apparatuses to use the function are provided.

The information processing method, information processing apparatus, and information processing system allow a user to easily recognize an ASP that can be used by the user even when the user memorizes login information for the ASP.

The information processing method, information processing apparatus, and information processing system allow a user to recognize that an ASP cannot be used or that only a part of the ASP can be used by the information processing apparatus used by the user.

According to an aspect of the present invention, an information processing method for processing information by an information processing apparatus communicable with a plurality of other information processing apparatuses includes: receiving identification information for identifying a user from at least one of the plurality of other information processing apparatuses; and logging into at least one service provider that provides a service and that is associated with the identification information in accordance with information on the service provider.

According to another aspect of the present invention, an information processing method for processing information by an information processing apparatus communicable with a plurality of other information processing apparatuses includes: receiving identification information, from at least one of the plurality of other information processing apparatuses, for identifying a user; logging into at least one service provider that provides a service and that is associated with the identification information in accordance with information on the service provider; and sending service provider information about the service provider that is logged into to the at least one of the plurality of other information processing apparatuses.

According to yet another aspect of the present invention, an information processing apparatus according to the present invention communicable with a plurality of other information processing apparatuses includes: a receiving unit configured to receive identification information for identifying a user from at least one of the plurality of other information processing apparatuses; and a login unit configured to log into at least one service provider that provides a service and that is associated with the identification information in accordance with information on the service provider.

According to still another aspect of the present invention, an information processing apparatus communicable with a plurality of other information processing apparatuses includes: a service provider information storage unit configured to store information on at least one service provider providing a service usable by a user; a login unit configured to log into the service provider in accordance with the information on the service provider; and an information sending unit configured to send service provider information about the service provider that is logged into by the login unit to the plurality of other information processing apparatuses.

According to still another aspect of the present invention, an information processing apparatus communicable with an external information processing apparatus includes: a sending unit configured to send identification information for identifying each user to the external information processing apparatus; a first receiving unit configured to receive first service provider information about a service provider that is logged into by the external information processing apparatus out of at least one service provider that provides a service and that is associated with the identification information from the external information processing apparatus; and a first display unit configured to display a screen based on the first service provider information.

Other features and advantages of the present invention will be apparent from the following description taken in conjunction with the accompanying drawings, in which like reference characters designate the same or similar parts throughout the figures.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 shows an example of screen information according to the first embodiment sent from the login agent to the MFP.

FIG. 13 shows an example of screen information according to the second embodiment sent from the login agent to the MFP.

DESCRIPTION OF THE EMBODIMENTS

Exemplary embodiments of the present invention will now be described in detail in accordance with the accompanying drawings.

First Embodiment

A first embodiment of the present invention will now be described with reference to FIGS. 1 to 11 and FIG. 15.

Figure 1:
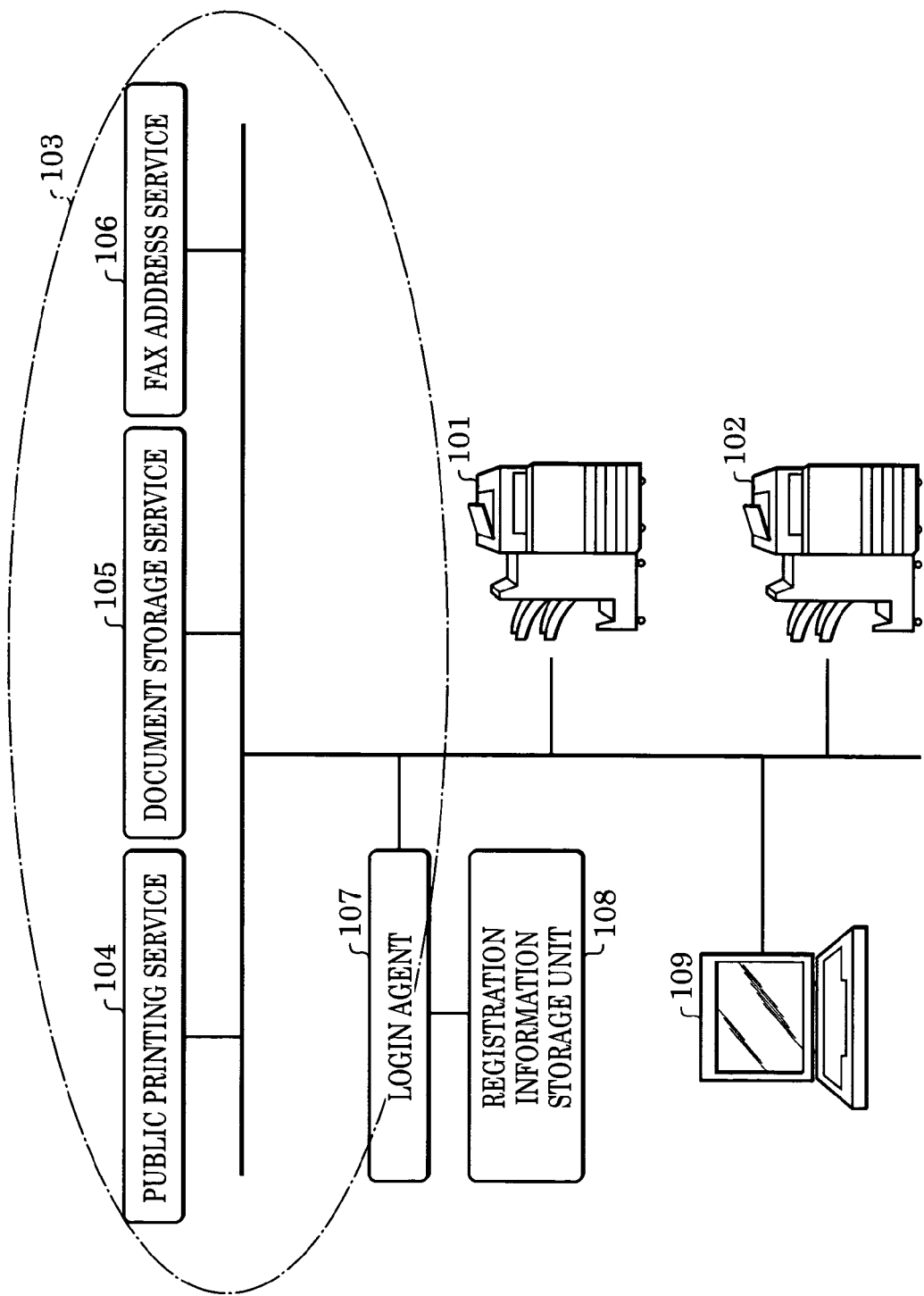
FIG. 1 is a block diagram showing the entire structure of an information processing system.

FIG. 1 is a block diagram showing the structure of an information processing system including an information processing apparatus according to the first embodiment. The information processing system processes information, such as image information.

Each of multifunction printers (MFPs) 101 and 102, which are information processing apparatuses according to the first embodiment, has multiple functions. The multiple functions are, for example, a printing function, a copy function, a facsimile (FAX) function, and an information reading (scan) function.

The information processing apparatuses are not limited to MFPs. The information processing apparatuses may be printers, copying machines, facsimile machines, or information reading apparatuses.

The Internet 103 includes application service providers (hereinafter, referred to as ASPs) that develop various services and is connected to the MFPs 101 and 102. A public printing service 104, which is one of the ASPs, provides a service in which a document is uploaded to a server on the Internet 103 via the Internet 103 so that a designated printer can print out the document at anytime and from anywhere. In order to receive the public printing service 104, each of the MFPs 101 and 102 includes a function to upload document data to a server via the Internet 103 (referred to as a SEND function) so as to upload the document data. Also, each of the MFPs 101 and 102 includes a printing function to print out the document data on each of the MFPs 101 and 102 (referred to as a PDL function) so as to print out the uploaded document data.

A document storage service 105, which is one of the ASPs, provides a service in which the MFPs 101 and 102 transfer scan image data to a server on the Internet 103 so that various data can be stored on the server. In order to receive the document storage service 105, each of the MFPs 101 and 102 includes the SEND function described above so as to transfer the document data to the server. Also, each of the MFPs 101 and 102 includes the PDL function so as to print out the document data on the server.

A FAX address service 106, which is one of the ASPs, provides a service in which address information on a facsimile machine is stored so as to be referred to when the MFPs 101 and 102 send a facsimile transmission. In order to receive the FAX address service 106, each of the MFPs 101 and 102 includes a FAX function to send the data described above.

In order to receive such various services on the Internet 103, the MFPs 101 and 102 have functions required for the various services. In the first embodiment, the MFP 101 has the PDL function and the SEND function but does not have the FAX function, and the MFP 102 has the PDL function and the FAX function but does not have the SEND function.

A login agent (login means) is an agent that logs into an ASP. Registration information storage unit (registration information recording means) 108 holds user information referred to by the login agent 107 and information on an ASP usable by each user.

In the first embodiment, the login agent 107 logs into an ASP by communication between the login agent 107 and any one of the MFPs 101 and 102 and an information terminal 109 used by a user and by communication between the login agent 107 and the ASP.

The information terminal 109 is, for example, a personal computer (PC), a personal digital assistant (PDA), or a cellular telephone. An ASP can be used by the information terminal 109. For example, the information terminal 109 logs into the document storage service 105, and stored image data is printed out using the PDL function of the MFP 102.

Figure 2:
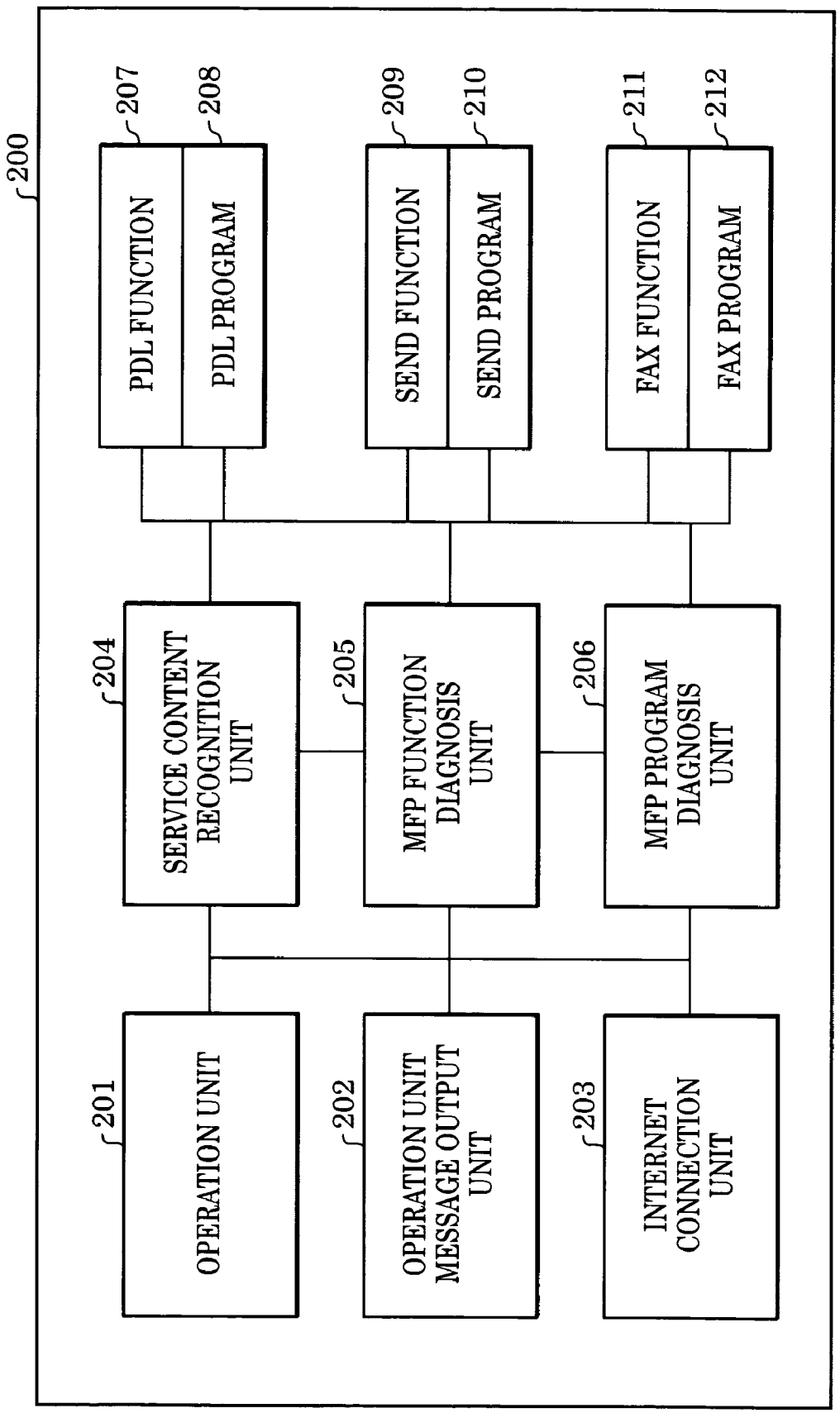
FIG. 2 is a block diagram showing the structure of an MFP.

FIG. 2 is a block diagram showing the structure of an MFP 200. The MFP 200 corresponds to the MFP 101 or the MFP 102 in FIG. 1.

The MFP 200 includes an operation unit 201, operation unit message output unit 202, Internet connection unit 203, service content recognition unit 204, MFP function diagnosis unit 205, MFP program diagnosis unit 206, a PDL function 207, a PDL program 208, a SEND function 209, a SEND program 210, a FAX function 211, and a FAX program 212.

The operation unit 201 includes a touch liquid crystal display (LCD) panel, a light-emitting diode (LED), an operation button, and the like. The operation unit message output unit 202 controls output of a message displayed on the LCD panel on the operation unit 201.

Figure 4:
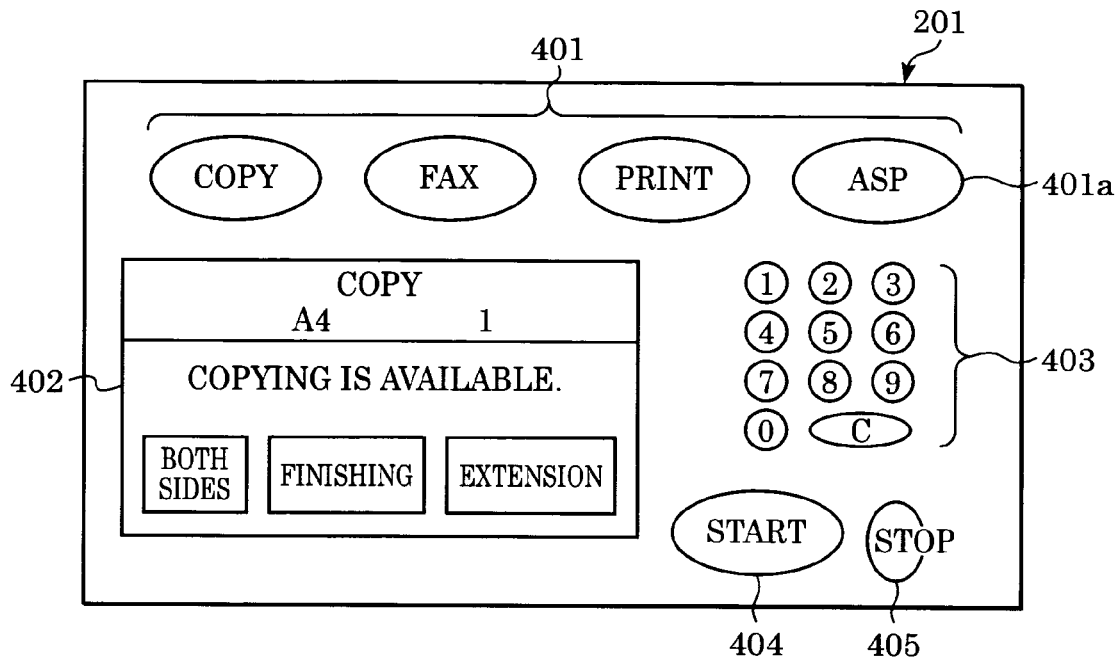
FIG. 4 shows an example of a display screen of an operation unit.

FIG. 4 shows an example of a display screen of the operation unit 201. Mode selection buttons 401 are provided for selecting a mode from among a copy mode, a FAX mode, a printing mode, and an ASP mode. A touch LCD panel 402 is provided not only for display but also for functioning as operation buttons. Operating one of the mode selection buttons 401 displays a screen corresponding to the selected mode on the LCD panel 402. Numeric keys 403 function as operation buttons to input a number. A start button 404 is used to instruct to start an operation in each mode. A stop button 405 is operated when a user wants to stop an operation being performed.

The Internet connection unit 203 establishes a network using a communication network, such as Ethernet, for connection to the Internet 103 (see FIG. 1). The service content recognition unit 204 recognizes service content of an ASP to which the MFP 200 can be connected to receive various services on the Internet 103 (see FIG. 1). The MFP function diagnosis unit 205 diagnoses and recognizes a function installed in the MFP 200. In the first embodiment, the MFP function diagnosis unit 205 determines that the MFP 101 has the PDL function 207 and the SEND function 209 and that the MFP 102 has the PDL function 207 and the FAX function 211. The MFP program diagnosis unit 206 determines whether or not a program for realizing each of the functions is provided in the current state, and diagnoses and recognizes a function installed in the MFP 200. The PDL function 207 is hardware for printing out document data on the MFPs 101 and 102. The PDL program 208 is software for driving and controlling the PDL function 207. The SEND function 209 is hardware for uploading document data to a server via the Internet 103. The SEND program 210 is software for driving and controlling the SEND function 209. The FAX function 211 is hardware for sending address information on a facsimile machine. The FAX program 212 is software for driving and controlling the FAX function 211.

Figure 15:
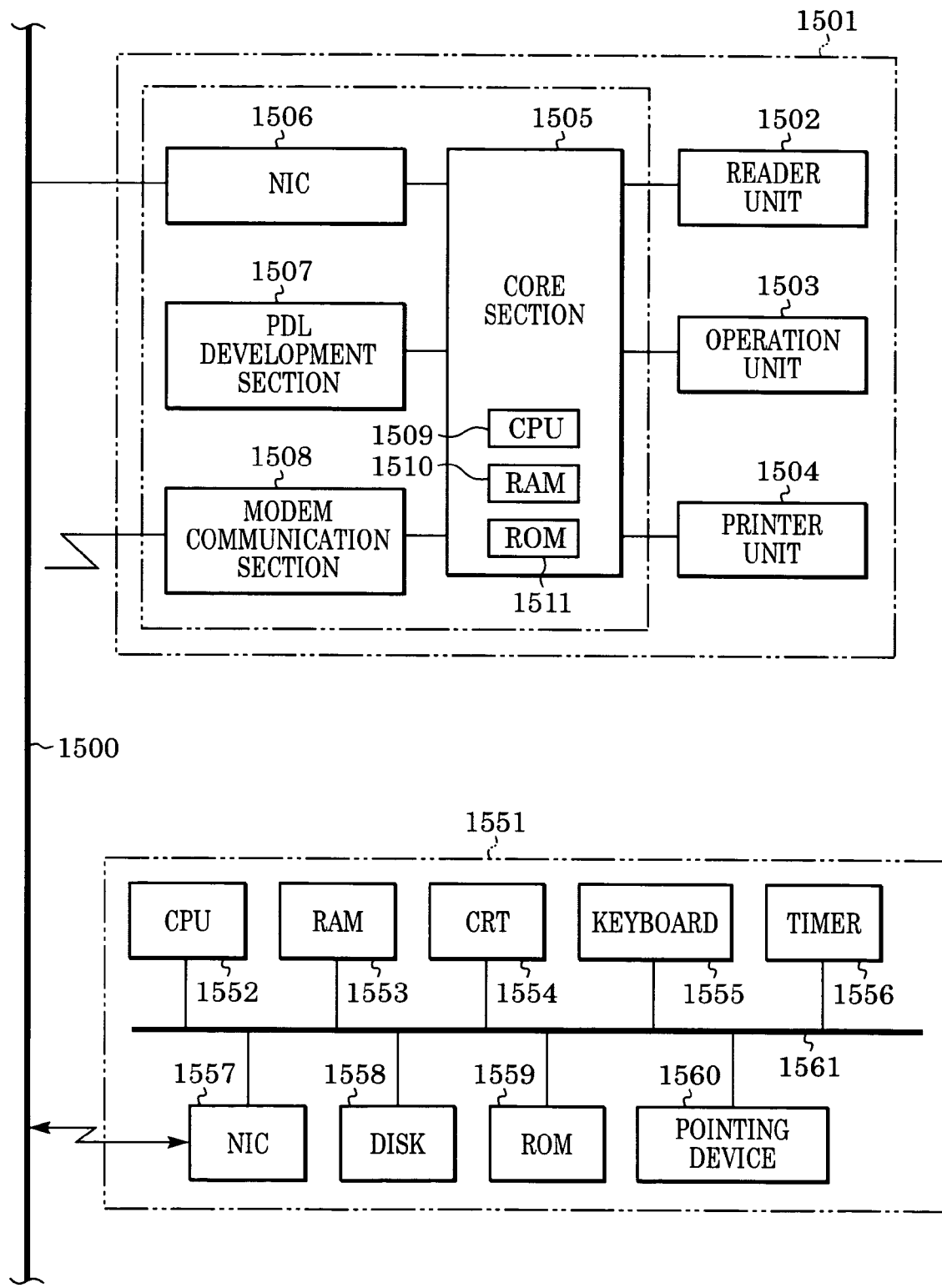
FIG. 15 shows the hardware structure of the information processing system.

FIG. 15 shows the hardware structure of each of the MFPs 101 and 102, the public printing service 104, the document storage service 105, the FAX address service 106, the login agent 107, and the information terminal 109.

In FIG. 15, a network 1500 corresponds to the Internet 103.

An information processing apparatus 1501 corresponds to the MFP 101 or the MFP 102. The information processing apparatus 1501 includes a controller unit, a reader unit 1502, an operation unit 1503, and a printer unit 1504. The controller unit includes a core section 1505, a network interface card (NIC) 1506, a page description language (PDL) development section 1507, and a modem communication section 1508.

The reader unit 1502 reads an original image set on the information processing apparatus 1501 and creates image data corresponding to the original image. For copying processing, the image data created by the reader unit 1502 is output to the printer unit 1504 via the core section 1505. The printer unit 1504 prints out an image corresponding to the image data created by the reader unit 1502 on recording paper.

The operation unit 1503 displays information via an LCD panel, and inputs an instruction from a user via an operation button. The operation unit 1503 corresponds to the operation unit 201. The modem communication section 1508 performs modulation and demodulation to communicate with an external facsimile machine via a public circuit-switching network. The NIC 1506 functions as an interface for the network 1500. The NIC 1506 corresponds to the Internet connection unit 203. The PDL development section 1507 develops PDL data received via the network 1500.

The core section 1505 transfers data between the reader unit 1502, the printer unit 1504, the operation unit 1503, the NIC 1506, the PDL development section 1507, and the modem communication section 1508. Here, a central processing unit (CPU) 1509 of the core section 1505 processes data in accordance with a software program stored in a random-access memory (RAM) 1510 or a read-only memory (ROM) 1511, and controls the reader unit 1502, the operation unit 1503, and the printer unit 1504.

Each of the operation unit message output unit 202, the service content recognition unit 204, the MFP function diagnosis unit 205, and the MFP program diagnosis unit 206 shown in FIG. 2 is realized by the CPU 1509 of the core section 1505 operating based on the software program.

Also, the PDL function 207 shown in FIG. 2 is realized by developing PDL data by the PDL development section 1507 and printing image data corresponding to the PDL data by the printer unit 1504. The SEND function 209 shown in FIG. 2 is realized by sending image data created by the reader unit 1502 via the NIC 1506 and the like. The FAX function 211 shown in FIG. 2 is realized by sending the image data created by the reader unit 1502 via the modem communication section 1508.

An information processing apparatus 1551 corresponds to the public printing service 104, the document storage service 105, the FAX address service 106, the login agent 107, or the information terminal 109.

The information processing apparatus 1551 includes a CPU 1552, a RAM 1553, a display, such as a cathode-ray tube (CRT) 1554, a keyboard 1555, a timer 1556, a NIC 1557, a hard disk (DISK) 1558, a ROM 1559, and a pointing device 1560 connected to each other via a system bus 1561.

A program for controlling the information processing apparatus 1551 is stored in the DISK 1558, which is a storage medium. The program is read into the RAM 1553 when necessary and the program is executed by the CPU 1552. The timer 1556 has a clock that counts accurate time.

Also, the CPU 1552 displays various types of information using the CRT 1554 and receives instructions from a user via the keyboard 1555 and the pointing device 1560. Furthermore, the CPU 1552 communicates with an external information processing apparatus via the NIC 1557 and the network 1500.

Figure 3:
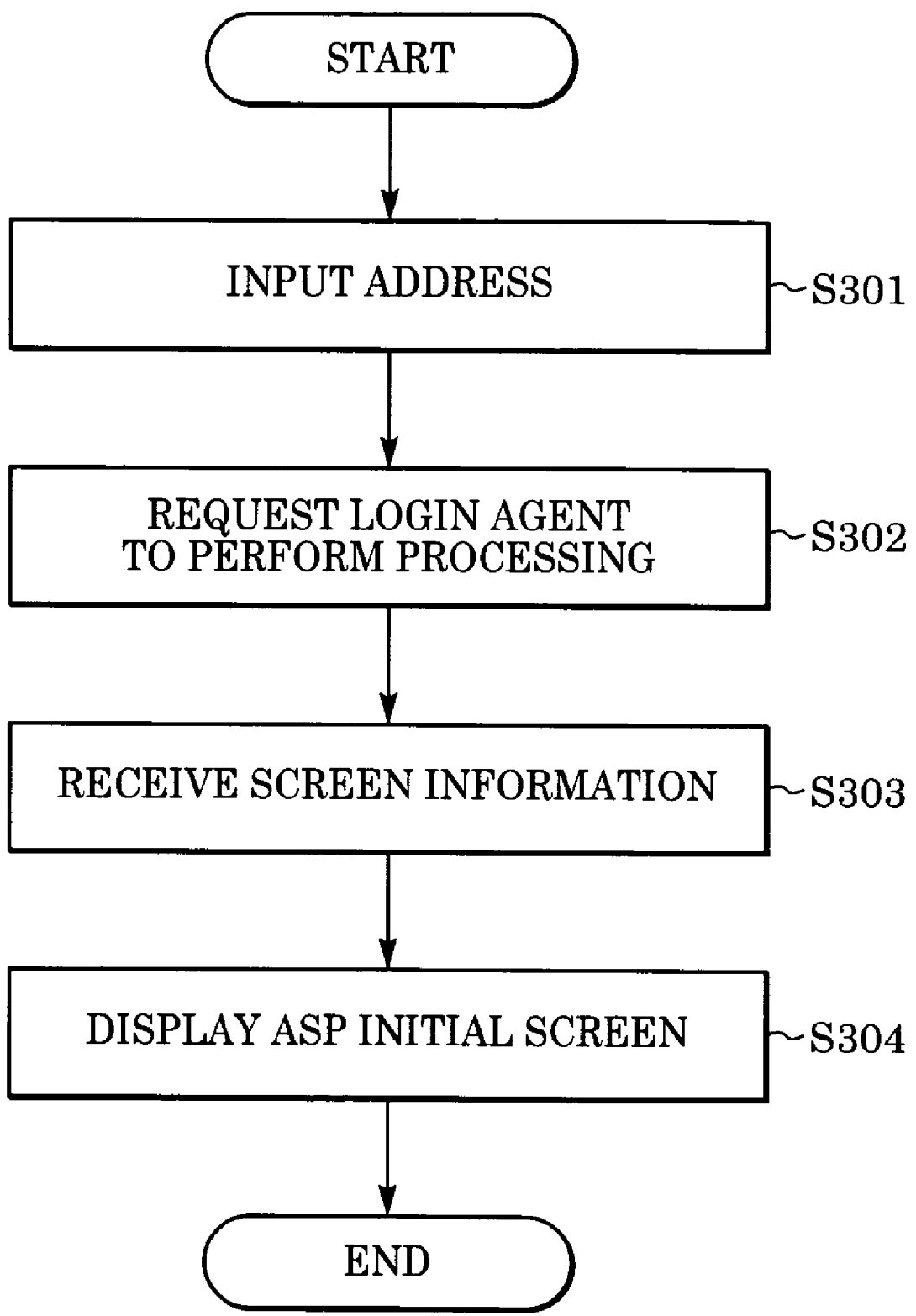
FIG. 3 is a flowchart showing a process performed by the MFP.

Operation of the MFP 101 according to the first embodiment is described next with reference to FIG. 3. FIG. 3 is a flowchart showing a process performed by the MFP 101 according to the first embodiment.

In the first embodiment, an example in which the MFP 101 is connected to the login agent 107 and in which an ASP1, which is the document storage service 105, and an ASP2, which is the FAX address service 106, are registered in the registration information storage unit 108 is explained.

In step S301, the MFP 101 inputs a user ID (identifier), a password, and an address of the login agent 107 designated by a user using the operation unit 201.

Figure 5:
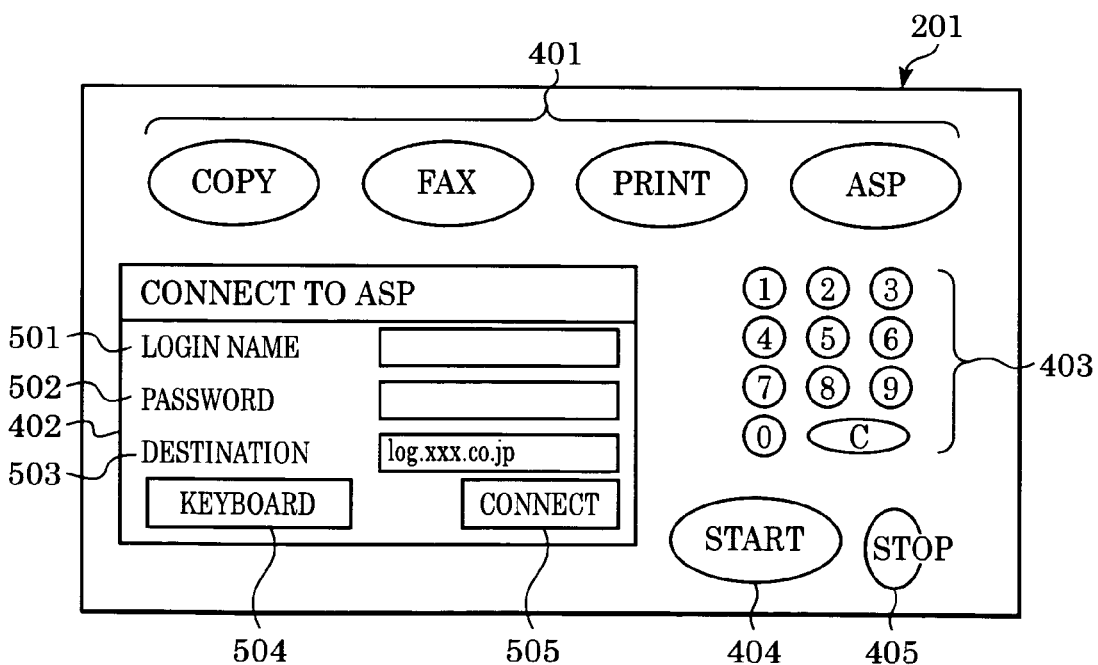
FIG. 5 shows an example of an input screen displayed when the MFP logs into a login agent.

FIG. 5 shows an example of an input screen of the operation unit 201 when the MFP 101 logs into the login agent 107 in step S301 in FIG. 3.

Operating an ASP button 401a, which is one of the mode selection buttons 401, switches the display screen of the LCD panel 402, as shown in FIG. 5.

In FIG. 5, a login input field 501 for inputting a login name, a password input field 502 for inputting a password, and an address input field 503 for inputting an ASP Internet address are displayed. When an Internet address of an ASP is input in the ASP Internet address input field 503, the MFP 101 is connected to the ASP.

In the first embodiment, inputting an Internet address of the login agent 107 connects the MFP 101 to the login agent 107. A keyboard button 504 is used for temporarily displaying a keyboard screen for easily inputting characters, such as letters of the alphabet. A connection button 505 is operated to start connection to an ASP after valid values are input in the input fields 501 to 503.

Referring back to FIG. 3, in step S302, the process requires the login agent 107 via the Internet connection unit 203 to perform processing. Here, the MFP 101 sends the user ID, the password, apparatus information, and the like to the login agent 107.

Figure 8:
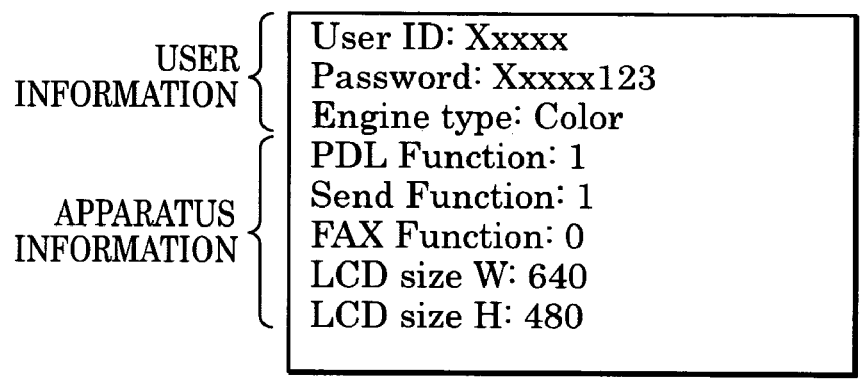
FIG. 8 shows an example of information sent from the MFP to the login agent when the MFP logs into the login agent.

FIG. 8 shows an example of information sent from the MFP 101 to the login agent 107 when the MFP 101 logs into the login agent 107 in step S302 in FIG. 3.

As the information about the user who is logging into the login agent 107, the user ID and the password are sent. Also, as the apparatus information, an engine type, the presence or absence of a PDL function, the presence or absence of a SEND function, the presence or absence of a FAX function, the number of pixels of an LCD panel, and other information are sent.

In step S303, the MFP 101 receives screen information of the ASPs from the login agent 107. In step S304, in accordance with the screen information, an initial screen for the ASPs is displayed on the LCD panel 402.

Figure 7:
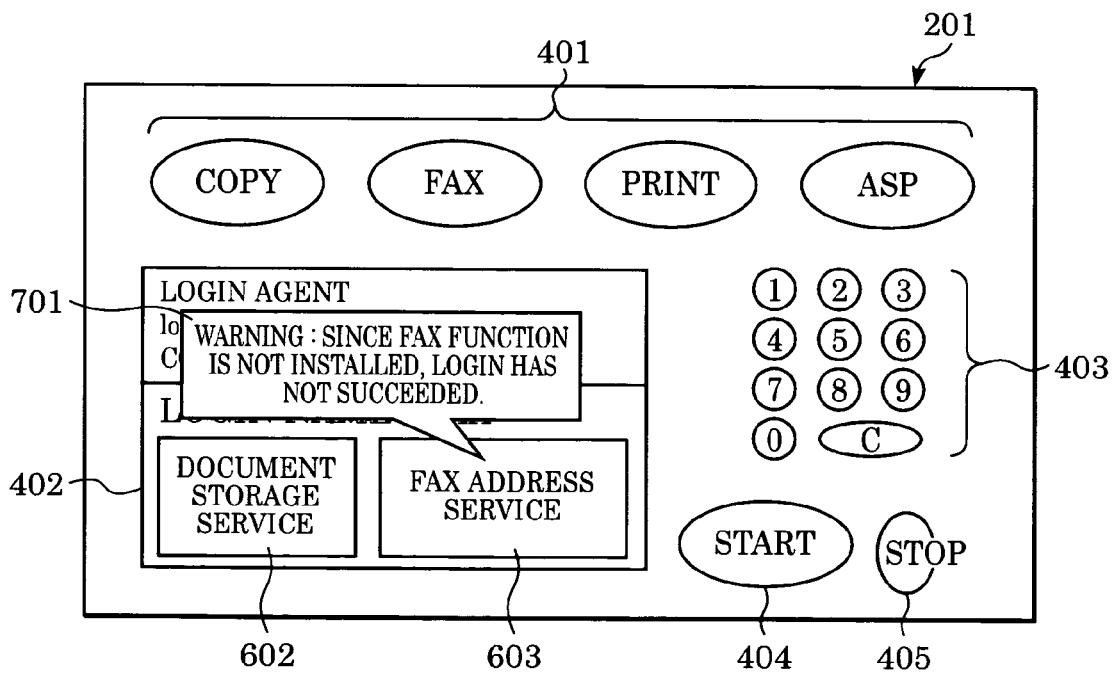
FIG. 7 shows an example of a screen displayed when a FAX address service button is pressed.

FIG. 10 shows an example of the screen information sent from the login agent 107 to the MFP 101 in step S303 in FIG. 3. The screen information includes ASP1 information and ASP2 information regarding ASP1 and ASP2, respectively. The information includes, for example, an Internet address, icon information, success or failure of login, and information for display in an error message if login has not succeeded. Since the MFP 101 does not log into the ASP 2, which is the FAX address service 106, a button for the FAX address service 106 displayed on the LCD panel 402 of the operation unit 201 is grayed out. The screen information received by the MFP 101 in step S303 includes a warning message 701 (FIG. 7). The display position and the size of an icon and the character size are determined by the login agent 107 on the basis of the number of icons and the size of the LCD panel 402.

Figure 6:
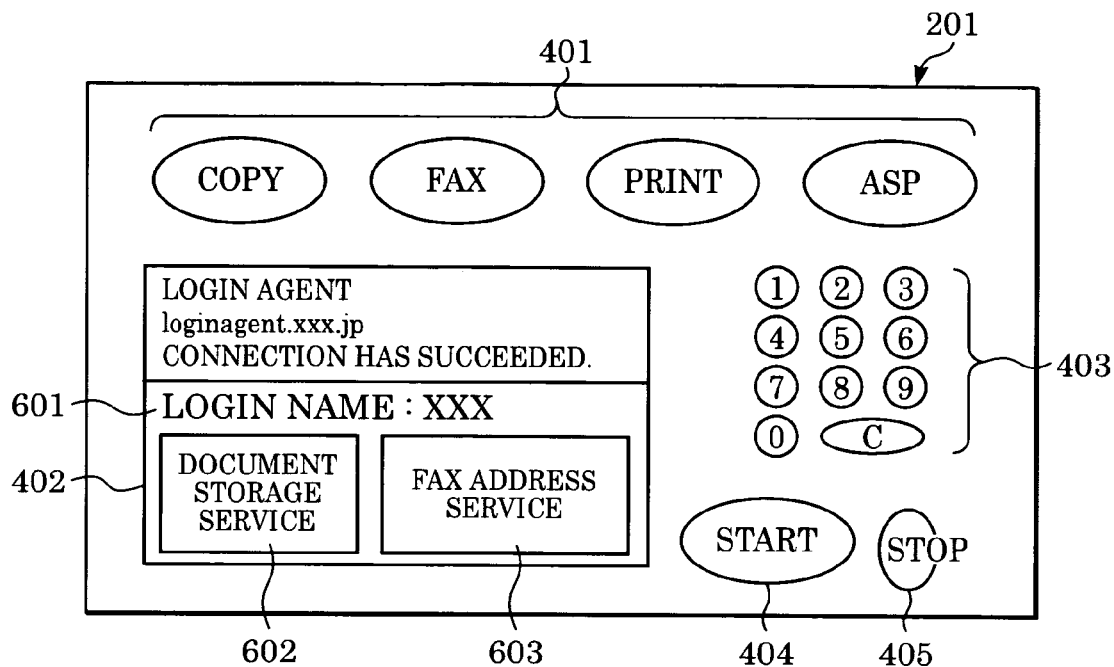
FIG. 6 shows an example of an initial screen according to a first embodiment displayed after the MFP receives screen information on ASPs from a login agent.

FIG. 6 shows an example of the initial screen of the ASPs displayed on the LCD panel 402 by the operation unit message output unit 202 in accordance with the screen information on the ASPs after the MFP 101 receives the screen information from the login agent 107 in step S304 in FIG. 3.

An Internet address of the login agent 107 into which the MFP 101 logs is displayed in an Internet address display section 601. An operation button 602 is operated to start the operation of the document storage service 105. Operating (pressing) the operation button 602 connects the MFP 101 to the document storage service 105 and displays the initial screen of the document storage service 105 shown in FIG. 6.

A FAX address service button 603 for starting the operation of the FAX address service 106 is displayed. Since the MFP 101 does not have a FAX function, the MFP 101 does not log into the FAX address service 106. The MFP 101 recognizes that the MFP 101 does not log into the FAX address service 106 on the basis of information ("ASP 2 Login Fail Message" in FIG. 10) included in the screen information and indicating that login has not succeeded. The FAX address service button 603 is grayed out. Thus, even if the FAX address service button 603 is operated, the FAX address service 106 cannot be performed.

Accordingly, the user can use the document storage service 105 on the MFP 101. Also, the user can know that the document storage service 105 can be used on the MFP 101. In contrast, the user can know that the FAX address service 106 cannot be used on the MFP 101 (alternatively, that it is meaningless to use the FAX address service 106 since a FAX function is not installed).

FIG. 7 shows an example of a screen of the operation unit 201 displayed when the FAX address service button 603 is pressed. The warning message 701 for informing the user that logging into the FAX address service 106 has not succeeded is displayed.

Although an example in which operating the FAX address service button 603 that is grayed out causes a warning message to be displayed is explained in the first embodiment, displaying the warning message on an initial screen of the login agent 107 can also achieve a similar effect.

Figure 11:
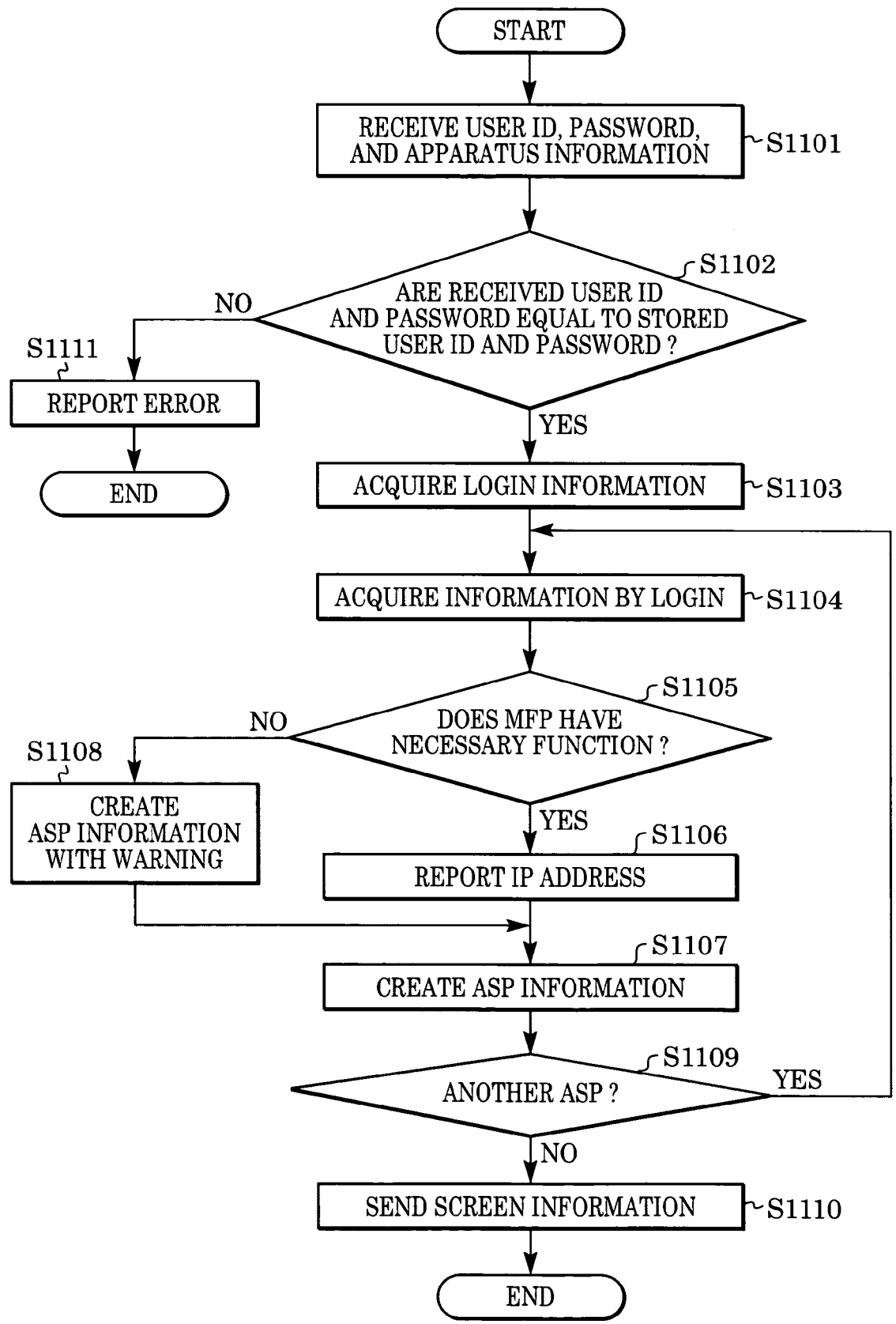
FIG. 11 is a flowchart according to the first embodiment showing a process performed by the login agent.

Operation of the login agent 107 according to the first embodiment is described next with reference to FIG. 11. FIG. 11 is a flowchart showing a process performed by the login agent 107 according to the first embodiment. For example, the CPU 1552 controls the process shown by FIG. 11 in accordance with a program corresponding to the flowchart in FIG. 11.

In FIG. 11, in step S1101, the login agent 107 receives the user ID, the password, the apparatus information, and the like sent from the MFP 101 in step S302 in FIG. 3.

In step S1102, the login agent 107 examines information stored in the registration information storage unit 108 and compares the received user ID and password to registered user ID and password combinations stored in the registration information storage unit 108.

Figure 9:
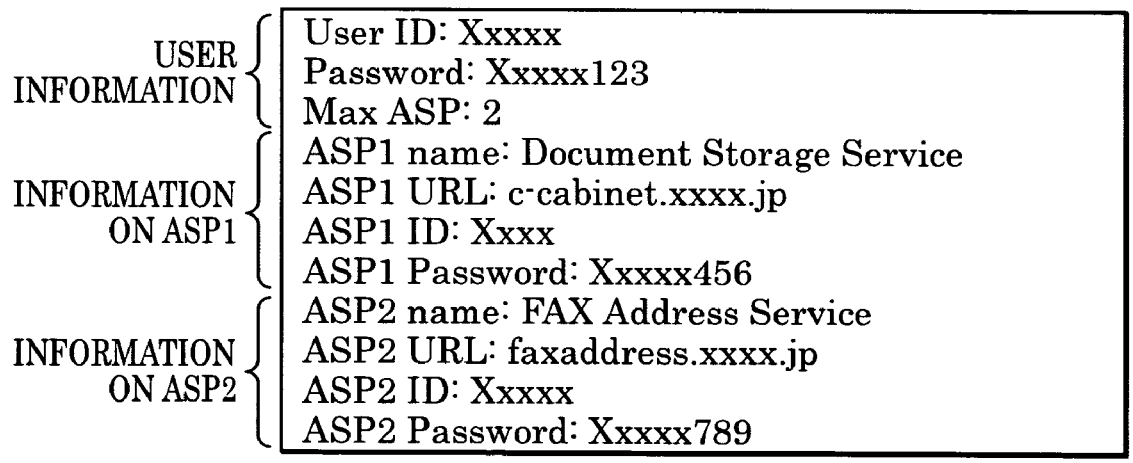
FIG. 9 shows an example of information stored in registration information storage unit.

FIG. 9 shows an example of information stored in the registration information storage unit 108. Information for a user is shown in FIG. 9. If a plurality of users is registered, similar information to that shown in FIG. 9 is stored for each of the users. Although two ASPs are registered in FIG. 9, the number of registered ASPs may be increased or reduced.

A user ID, a password, and the number of registered ASPs are stored as user information. The name of the ASP1, an Internet address of the ASP1, a login name when the user logs into the ASP1, and a password when the user logs into the ASP1 are stored as information on the ASP1. Information similar to that on the ASP1 is stored as information on the ASP2.

Referring again to FIG. 11, if the received user ID and password is not equal to any of the registered user ID and password combinations, processing moves from step S1102 to step S1111 where an error report is sent to the MFP 101. Processing of FIG. 11 then ends.

On the other hand, when the received user ID and password are equal to a registered user ID and password, processing moves from step S1102 to step S1103 where information regarding logging into the ASPs (hereinafter, referred to as login information) registered in association with the user ID is acquired. In the first embodiment, the two ASPs, which are the document storage service 105 and the FAX address service 106, are registered. In step S1102, the user is authenticated on the basis of comparison between the received user ID and password and the registered user ID and password. If the same user ID and password as the received user ID and password are registered in the registration information storage unit 108, it is determined that authentication is successfully completed. If authentication is successfully completed, login processing is performed.

In step S1104, the login agent 107 logs into the ASPs registered in association with the user ID using the acquired login information to acquire information about a function necessary for a service provided by each of the ASPs and information to be displayed on the operation unit 201. Here, it is assumed that the login agent 107 first logs into the document storage service 105.

In step S1105, the login agent 107 compares the information about the function necessary for the service provided by the ASP with the apparatus information received in step S1101 to determine whether or not the MFP 101 has the necessary function. Since functions necessary for using the document storage service 105 are a PDL function and a SEND function, it is determined that the MFP 101 has the necessary functions.

If it is determined in step S1101 that the MFP 101 has the necessary function, processing proceeds to step S1106 where an Internet protocol (IP) address of the MFP 101 is reported to the document storage service 105 so that the MFP 101 can directly access the document storage service 105. Thus, although the login operation is performed by the login agent 107, in the subsequent operations, the MFP 101 directly operates the document storage service 105.

On the other hand, if it is determined in step S1101 that the MFP 101 does not have a necessary function, ASP information with a warning is created in step S1108. The ASP information for the FAX address service 106 with the warning is shown as the ASP2 information in FIG. 10. For example, the ASP2 information includes a warning message, such as "Warning: Since FAX function is not installed, login has not succeeded."

In step S1107, information on the ASP (hereinafter, referred to as ASP information) into which the login agent 107 logs is created and stored. ASP information for the document storage service 105 is shown as the ASP1 information in FIG. 10.

In step S1109, it is determined whether or not there is another ASP registered in association with the user ID. If so, the process returns to step S1104. In this example, logging into the FAX address service 106 is performed.

In step S1104, the login agent 107 logs into the FAX address service 106 to acquire information on a necessary function and information to be displayed. In order to use the FAX address service 106, a FAX function is necessary. However, since the MFP 101 does not have a FAX function, in step S1105, it is determined that the FAX address service 106 cannot be used, and the login agent 107 logs out from the FAX address service 106.

When it is determined in step S1009 that there are no more ASPs registered in association with the user ID, processing moves to step S1110 where screen information including the ASP information created in step S1107 or step S1108 is sent to the MFP 101. The MFP 101 displays a screen on the operation unit 201 on the basis of the screen information reported from the login agent 107. Processing of FIG. 11 then ends.

According to the information processing apparatus of the first embodiment, information on an ASP usable by each user is stored in an MFP accessible from a plurality of MFPs (the MFPs 101 and 102) or a server. Information on the login agent 107 that can log into the ASP in accordance with the information on the ASP instead of the user and ASP information on the ASP into which the login agent 107 logs in are reported to the MFP 101, the MFP 102, or the information terminal 109. Also, the MFP 101, the MFP 102, or the information terminal 109 displays an operation button and a menu for the ASP on a display unit in accordance with the information of the ASP into which the login agent 107 logs in a login state. If a plurality of ASPs is registered, logging into the plurality of ASPs can be performed.

Since the login agent 107 stores a user ID and a password for each ASP and can log into the ASP using the stored user ID and password, a user can log into a usable ASP without memorizing information necessary for logging into the ASP.

Also, since the login agent 107 logs into each ASP and sends image information to the MFP 101, the user can know an identity of an ASP that can be used by the user.

Also, it is convenient that the functions described above can be used by a plurality of information processing apparatuses, such as MFPs or PCs, as long as they are connectable to the login agent 107.

Second Embodiment

A second embodiment of the present invention is described below with reference to FIGS. 12 to 14. The basic structure of an information processing apparatus according to the second embodiment and an information processing system including the information processing apparatus is the same as in the first embodiment shown in FIGS. 1 and 2. Therefore, FIGS. 1 and 2 are appropriately used for explaining the second embodiment.

Next is a description of an example in which the MFP 102 has a PDL function and a FAX function, but does not have a SEND function. Descriptions of logging into the document storage service 105 and the FAX address service 106 are provided below.

The second embodiment is different from the first embodiment in that a restricted login is performed because the MFP 102 does not have a SEND function and the login display is displayed on the operation unit 201 of the MFP 102. In the second embodiment, the restricted login is performed via a display of an initial screen on the operation unit 201.

For a simple explanation, a main body of the MFP 102 is the same as that of the MFP 101 and the structure of the operation unit and the like of the MFP 102 is the same as that of the MFP 101. Also, the same content is stored in the registration information storage unit 108 of the MFP 101 and the registration information storage unit 108 of the MFP 102. Furthermore, the same information as in the MFP 101 is input to the MFP 102 by a user.

The MFP 102 operates in accordance with the flowchart in FIG. 3. The login agent 107 operates in accordance with a flowchart shown in FIG. 12. FIG. 12 is a flowchart showing a process according to the second embodiment performed by the login agent 107. For example, the CPU 1552 controls the process shown in FIG. 12 in accordance with a program corresponding to the flowchart of FIG. 12.

Figure 12:
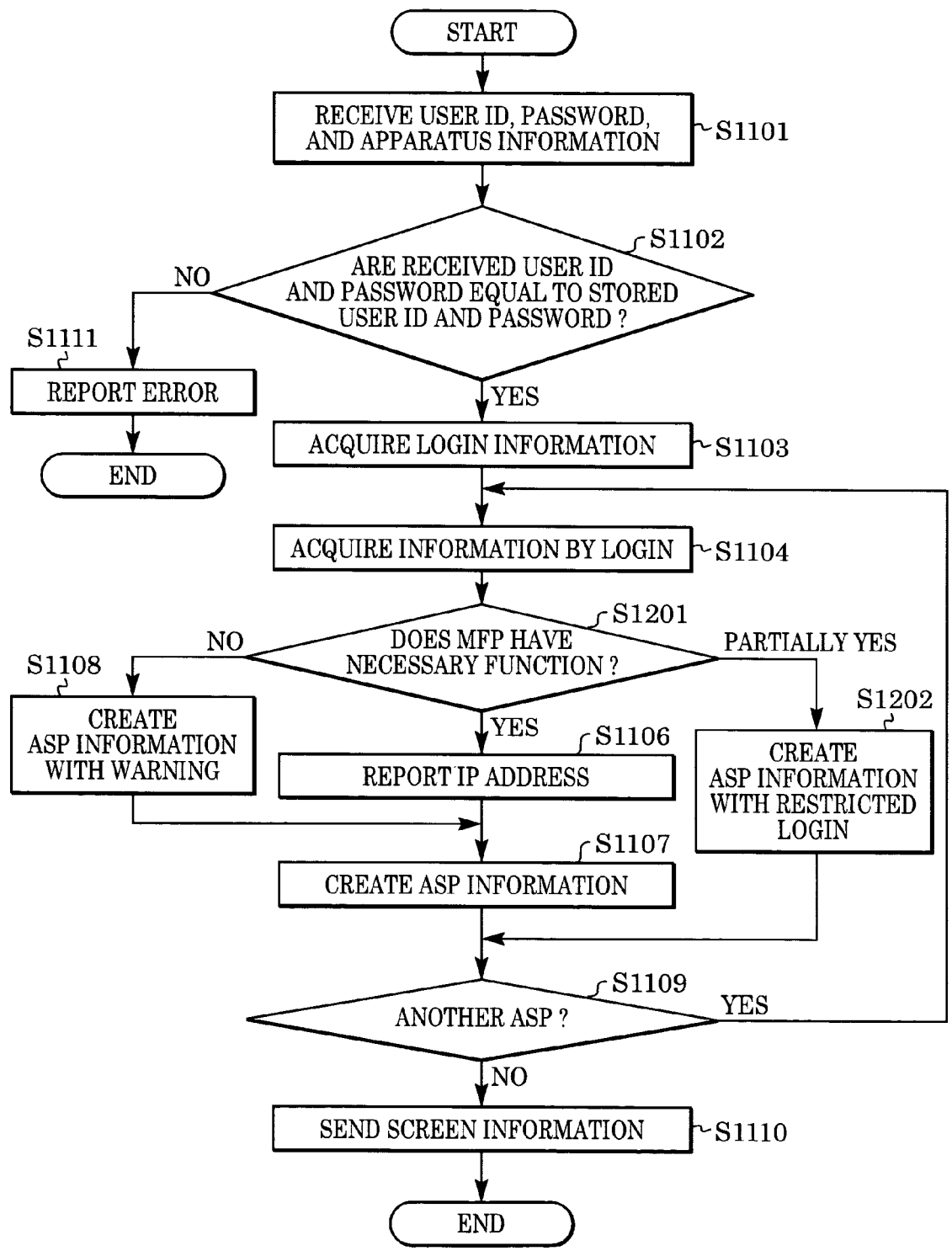
FIG. 12 is a flowchart according to a second embodiment showing a process performed by the login agent.

The flowchart of FIG. 12 is different from the flowchart of FIG. 11 in the determination in step S1201 and creation of ASP information in step S1202.

In other words, processing performed in steps S1101 to S1104 and steps S1106 to S1111 in FIG. 12 is the same as processing performed in steps S1101 to S1104 and in steps S1106 to S1111 in FIG. 11.

In step S1201, the login agent 107 compares information on a function necessary for a service provided by an ASP with the apparatus information received in step S1101 to determine whether the MFP 102 has all the necessary functions, the MFP 102 has none of the necessary functions, or the MFP 102 has only a part of the functions necessary for the service.

For example, when the login agent 107 logs into the document storage service 105, although a document stored in the document storage service 105 can be printed out since the MFP 102 has a PDL function, a manuscript cannot be scanned and a document cannot be uploaded to the document storage service 105 since the MFP 102 does not have a SEND function. In this case, it is determined that restricted login is performed for the document storage service 105. In step S1202, ASP information with restricted login is created.

FIG. 13 shows an example of image information sent from the login agent 107 to the MFP 102 in step S1110 in FIG. 12. An example of the ASP information with restricted login created in step S1202 is shown as the ASP1 information in FIG. 13.

Figure 14:
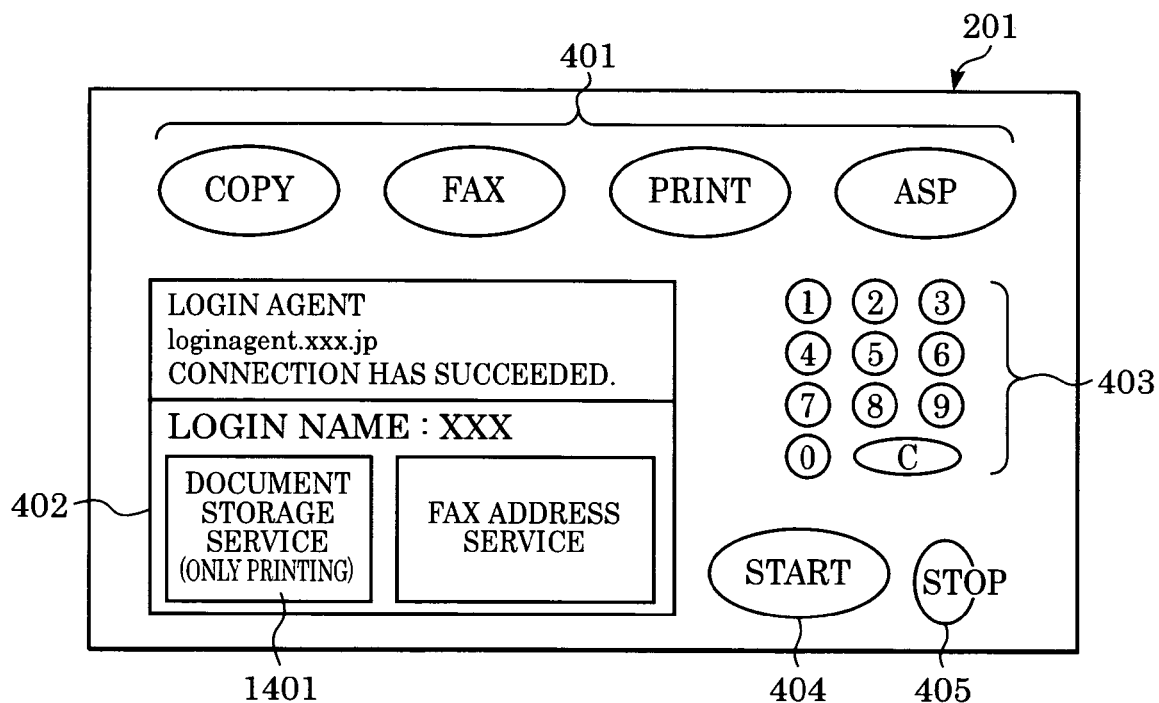
FIG. 14 shows an example of an initial screen according to the second embodiment displayed after the MFP receives the screen information sent from the login agent.

FIG. 14 shows an example of an initial screen displayed on the LCD panel 402 by the operation unit message output unit 202 after the MFP 102 receives the screen information sent from the login agent 107 in step S1110 in FIG. 12 in accordance with the screen information. In FIG. 14, an operation button 1401 for the document storage service 105 is displayed. In FIG. 14, a fact that an upload function cannot be used and that only a printing function can be used is displayed. After pressing the operation button 1401, the MFP 102 is connected to the document storage service 105 so as to receive the document storage service 105.

According to the information processing apparatus of the second embodiment, when the MFP 101, the MFP 102, or the information terminal 109 is connected to the login agent 107, a function (a PDL function, a SEND function, a FAX function, an information display function, or the like) installed in the MFP 101, the MFP 102, or the information terminal 109 is examined and reported. The login agent 107 acquires information on a function necessary for using an ASP from the ASP. Also, the login agent 107 determines whether or not to log into the registered ASP in accordance with the acquired information. If the login agent 107 determines to log into the ASP and only a part of the service provided by the ASP can be used, restricted login can be performed.

Also, according to the information processing apparatus of the second embodiment, if logging into a registered ASP is not performed or if restricted login is performed, information about the fact that logging into the registered ASP is not performed or that the restricted login is performed or warning information is displayed on a display unit of the MFP 101, the MFP 102, or the information terminal 109 used by a user. Alternatively, a display item, such as an operation button or a menu, corresponding to an unusable ASP or function displayed on the display unit may be displayed so as to be different from other display items (for example, the display item corresponding to the unusable ASP or function is grayed out), so that the unusable ASP or function can be easily identified the user.

Third Embodiment

In the present invention, information on a function necessary for using each ASP may be stored in information registered in the login agent 107 so that determination of whether or not to perform login or determination of whether or not to perform restricted login can be performed without acquiring information from the ASP.

Modifications

While the preferred embodiments of the present invention have been described, the present invention is not limited to each of the embodiments described above. Various changes and modifications may be made to the present invention as long as functions defined by the claims or the functions realized by the embodiments can be achieved.

A storage medium on which a program including computer-readable program code for realizing the functions (the information processing method) of the embodiments described above may be provided. The storage medium may be stored to a system or an apparatus and by reading and executing the program code stored in the storage medium by a computer (or a central processing unit (CPU), a microprocessing unit (MPU), or the like) of the system or the apparatus.

Also, the storage medium for supplying the program code may be, for example, a flexible disk, a hard disk, an optical disk, a magnetic optical disk, a compact disk read-only memory (CD-ROM), a compact disk-recordable (CD-R), a magnetic tape, a nonvolatile memory card, a ROM, or the like.

The embodiments described above can be realized not only by executing the read program code by the computer but also by performing part or all of the actual processing by an operating system (OS) or the like running on the computer on the basis of instructions of the program code.

Furthermore, after the program code read from the storage medium is written into a function expansion board inserted into the computer or to a memory provided in a function expansion unit connected to the computer, a CPU or the like mounted on the function expansion board or function expansion unit may perform all or a part of the actual processing in accordance with instructions of the program code.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for controlling an information processing apparatus communicable with an other information processing apparatus and a service provider via a network, the service provider providing a service for a user, the method comprising:

receiving, from the other information processing apparatus, identification information for identifying a user of the other information processing apparatus;

acquiring log information corresponding to the user identified by the received identification information from a storage unit, the login information including service information for indicating one or a plurality of service providers usable by the user and authentication information for logging into each of one or a plurality of service providers indicated by the service information, the storage unit storing the login information;

logging into each service provider indicated by the acquired service information, using the acquired authentication information, to allow the user to use a service provided by each service provider; and transmitting, to the other information processing apparatus, information indicating one or a plurality of service providers logged into using the acquired authentication information.

2. The method according to claim 1, wherein the authentication information stored in the storage unit includes a user login name and a user password necessary for logging into each service provider.

3. The method according to claim 1, further comprising:

receiving authentication information corresponding to the identification information from the other information processing apparatus;

authenticating the user based on the identification information and the authentication information; and determining whether authentication was successful, wherein the login to each service provider is performed if it is determined that the authentication was successful.

4. The method according to claim 1, further comprising:

receiving function information indicating at least one function installed in the other information processing apparatus from the other information processing apparatus;

comparing the function indicated by the function information with at least one function necessary for the service provided by the service provider indicated by the service information; and reporting to the other information processing apparatus if the function necessary for the service is not installed in the other information processing apparatus.

5. The method according to claim, 1 wherein the service provided by the service provider is at least one of an output service capable of outputting information from a designated output apparatus, an information storage service for storing the information, and a facsimile address service for referring to a facsimile address when a facsimile transmission is performed.

6. The method according to claim 1, wherein when logging into each service provider is not successfully performed, the other information processing apparatus displays information indicating that logging into each service provider was not successfully performed.

7. The method according to claim 1, wherein when logging into a service provider is not successfully performed, the other information processing apparatus displays a display item corresponding to the service provider that is not logged into so as to be different from other display items.

8. The method according to claim 1, wherein the other information processing apparatus displays an operation screen for controlling each service provider based on the transmitted information indicating each service provider that is logged into using the acquired authentication information.

9. The method according to claim 4, wherein the function installed in the other information processing apparatus is at least one of a printing function for printing out information, a facsimile function for sending information by facsimile transmission, a data transfer function for transferring data, and an information displaying function for displaying information.

10. The method according to claim 4, further comprising reporting to the other information processing apparatuses that restricted login is performed when the other information processing apparatus does not have at least one function necessary for the service provided by the service provider.

11. The method according to claim 10, wherein when the restricted login is performed, the other information processing apparatus displays information indicating that the restricted login is performed.

12. The method according to claim 10, wherein when the restricted login is performed, the other information processing apparatus displays a display item corresponding to the service provider into which the restricted login is performed so as to be different from other display items.

13. An information processing apparatus communicable with an other information processing apparatus and a service provider via a network, the service provider providing a service for a user, the information processing apparatus comprising:

a receiving unit configured to receive, from the other information processing apparatus, identification information for identifying a user of the other information processing apparatus;

an acquiring unit configured to acquire login information corresponding to the user identified by the identification information received by the receiving unit from a storage unit, the login information including service information for indicating one or a plurality of service providers usable by the user and authentication information for logging into each of one or a plurality of service providers indicated by the service information, the storage unit storing the login information;

a login unit configured to log into each service provider indicated by the service information acquired by the acquiring unit, using the authentication information acquired by the acquiring unit, to allow the user to use a service provided by each service provider; and a transmitting unit configured to transmit, to the other information processing apparatus, information indicating one or a plurality of service providers logged into by the login unit.

14. An information processing apparatus according to claim 13, wherein the information transmitted by the transmitting unit is a name, a URL or an icon indicating one or a plurality of service providers logged into by the login unit.

15. An information processing apparatus according to claim 13, further comprising:
- a comparing unit configured to compare a function indicated by function information with at least one function necessary for the service provider,
- wherein the receiving unit further receives, from the other information processing apparatus, the function information indicating at least one function installed in the other information processing apparatus, and
- the transmitting unit further transmits, to the other information processing apparatus, information indicating that the function necessary for the service is not installed in the other information processing apparatus, if the function necessary for the service does not coincide with the function indicated by the function information received by the receiving unit.

16. An information processing apparatus communicable with an other information processing apparatus and a service provider via a network, the service provider providing a service for a user, the information processing apparatus comprising:
- a receiving unit configured to receive, from the other information processing apparatus, identification information for identifying a user of the other information processing apparatus;
- an acquiring unit configured to acquire login information corresponding to the user identified by the identification information received by the receiving unit from a storage unit, the login information including service information for indicating one or a plurality of service providers usable by the user and authentication information for logging into each of one or a plurality of service providers indicated by the service information, the storage unit storing the login information;
- a login unit configured to log into each service provider indicated by the service information acquired by the acquiring unit, using the authentication information acquired by the acquiring unit, to allow the user to use a service provided by each service provider.

* * * * *